US012589812B2

(12) United States Patent (10) Patent No.: US 12,589,812 B2

Adam et al. (45) Date of Patent: Mar. 31, 2026

(54) CROSS CAR BEAM FOR A VEHICLE

(71) Applicant: LISA DRÄXLMAIER GMBH, Vilsbiburg (DE)

(72) Inventors: Istvan Adam, Budapest (HU); Wolfgang Baba, Landshut (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 313 days.

(21) Appl. No.: 18/481,106

(22) Filed: Oct. 4, 2023

(65) Prior Publication Data

US 2024/0025485 A1 Jan. 25, 2024

Related U.S. Application Data

(63) Continuation of application No. PCT/EP2022/057286, filed on Mar. 21, 2022.

(30) Foreign Application Priority Data

Apr. 7, 2021 (GB) ...................................... 2104929

(51) Int. Cl.
| | |
|---|---|
| *B62D 25/00* | (2006.01) |
| *B60R 21/045* | (2006.01) |
| *B62D 25/14* | (2006.01) |
| *B62D 29/04* | (2006.01) |

(52) U.S. Cl.
CPC .......... *B62D 25/145* (2013.01); *B60R 21/045* (2013.01); *B62D 29/04* (2013.01)

(58) Field of Classification Search
CPC .... B62D 25/145; B62D 29/043; B62D 29/04; B62D 29/041; B60R 21/045; B60R 2021/0266

USPC ...................................................... 296/193.02
See application file for complete search history.

(56) References Cited

U.S. PATENT DOCUMENTS

| | | | |
|---|---|---|---|
| 4,573,707 A * | 3/1986 | Pabst ................... | B62D 29/002 296/204 |
| 5,762,395 A | 6/1998 | Merrifield et al. | |
| 8,079,635 B2 * | 12/2011 | DeVor ................. | B60N 2/4235 296/187.08 |
| 11,407,454 B2 | 8/2022 | Guerreiro et al. | |
| 2004/0056463 A1 | 3/2004 | Marks et al. | |

(Continued)

FOREIGN PATENT DOCUMENTS

| | | |
|---|---|---|
| DE | 10055051 A1 | 5/2002 |
| DE | 102006051948 B3 | 6/2008 |
| DE | 102014202857 A1 | 10/2014 |
| EP | 1291266 A1 | 3/2003 |
| EP | 2489499 A1 | 8/2012 |

OTHER PUBLICATIONS

International Search Report issued in corresponding International Application PCT/EP2022/057282, mailed Jun. 23, 2022.

(Continued)

*Primary Examiner* — Steven O Douglas

(74) *Attorney, Agent, or Firm* — Burris Law, PLLC

(57) ABSTRACT

The present disclosure relates to a cross car beam for a vehicle, the cross car beam including a first main body extending in a longitudinal direction from a first end to a second end. The first main body has a u-shaped cross section following the longitudinal direction. The cross car beam is formed integrally by at least one fiber reinforced polymer.

12 Claims, 4 Drawing Sheets

(56) References Cited

U.S. PATENT DOCUMENTS

| | | | |
|---|---|---|---|
| 2007/0187960 A1* | 8/2007 | Evans ..................... | B60R 19/18 |
| | | | 293/133 |
| 2007/0295453 A1 | 12/2007 | Koelman et al. | |
| 2008/0048425 A1 | 2/2008 | Hayata | |
| 2011/0285174 A1 | 11/2011 | Malek et al. | |
| 2015/0145275 A1 | 5/2015 | Baudard et al. | |
| 2015/0151793 A1 | 6/2015 | Appasamy et al. | |
| 2017/0274857 A1 | 9/2017 | An et al. | |
| 2017/0305476 A1 | 10/2017 | Kulkarni et al. | |
| 2018/0290691 A1 | 10/2018 | Kapila et al. | |
| 2019/0168818 A1 | 6/2019 | Aken et al. | |
| 2020/0070893 A1 | 3/2020 | Atkin et al. | |
| 2020/0189661 A1* | 6/2020 | Kong ................... | B62D 25/145 |
| 2022/0119042 A1* | 4/2022 | Zhang ................... | B60K 37/10 |

OTHER PUBLICATIONS

Examination Report issued in corresponding GB Application 2104927.
5, dated Jun. 5, 2023, 2 pages.
International Search Report issued in corresponding International
Application PCT/EP2022/057286, mailed Jun. 28, 2022.
Examination Report issued in corresponding GB Application 2104929.
1, dated Jun. 12, 2023, 2 pages.
International Search Report issued in corresponding International
Application PCT/EP2022/057283, mailed Jun. 24, 2022.
Examination Report issued in corresponding GB Application 2104928.
3, dated Jun. 12, 2023, 2 pages.

\* cited by examiner

1

CROSS CAR BEAM FOR A VEHICLE

CROSS-REFERENCE TO RELATED APPLICATIONS

This application is a continuation of International Application No. PCT/EP2022/057286, filed on Mar. 21, 2022, which claims priority to and the benefit of GB 2104929.1 filed on Apr. 7, 2021. The disclosures of the above applications are incorporated herein by reference.

FIELD

The present disclosure relates to a cross car beam for a vehicle.

BACKGROUND

The statements in this section merely provide background information related to the present disclosure and may not constitute prior art.

In the prior art vehicle cockpit cross beams are manufactured out of welded steel, aluminum, die cast magnesium or in combination with polymerized material as hybrid assembly together with metal components. Cross car beams must meet high mechanical strengths, as such metal components were indispensable. As a consequence vehicle cockpit cross beams include a high weight and have to be assembled in further production steps with numerous additional components. So, the installation effort and the CO2 usage during production and the use in a vehicle of such cross car beams is very high.

SUMMARY

This section provides a general summary of the disclosure and is not a comprehensive disclosure of its full scope or all of its features.

The present disclosure provides a cross car beam that is manufactured without any types of metal parts. The present disclosure aims to reduce the CO2 usage during production and during the use of the cross car beam by reducing the weight and by enabling a system integrated structure.

According to the disclosure, a cross car beam for a vehicle is proposed including a first main body extending in a longitudinal direction from a first end to a second end, at least one deformable crash pad adapted to absorb impact energy, and at least one collapsible guiding element placed adjacent to the crash pad. The collapsible guiding element includes a guiding surface adapted to guide the crash pad during deformation, and the cross car beam is formed integrally by at least one fiber reinforced polymer.

By forming the cross car beam integrally by at least one fiber reinforced polymer the total number of components can be reduced. Nevertheless, the cross car beam should be able to absorb the forces that occur. The occurring forces are transferred from the vehicle body to the cross car beam via the fixing points. The place and the number of fixing points are predefined from the body manufacturer. Likewise, the occurring forces that will be transferred to the cross car beam and that determine the stiffness of the cross car beam are predefined from the body manufacturer.

The force absorption is made possible on the one hand by the u-shaped cross section extending continuously in the longitudinal direction from the first end to the second end. The u-shaped cross-section is easy to produce and has a high degree of rigidity.

On the other hand, the force absorption is achieved by the fibers reinforcing the polymer. The fibers include glass fibers or carbon fibers whose orientation in the polymer is aligned with the force flow through the cross car beam.

In the event of an impact event, the at least one deformable crash pad is adapted to absorb impact energy, such as the impact energy of a body from the passenger compartment.

Additionally, energy absorption capability is increased because the at least one collapsible guiding element is placed adjacent to the crash pad, wherein the collapsible guiding element includes a guiding surface adapted to guide the crash pad during deformation. Consequently, the crash pad is guided along the guiding surface of the guiding element during deformation, which provides improved impact energy absorption. For example, the crash pad functions even if the impact acts laterally or at least not central on the crash pad.

A u-shaped cross-section, or a substantially u-shaped cross-section, can be understood as any cross section that has a suitable stiffness and easy demolding after injection molding. For example, the cross-section could also be v-shaped, c-shaped or w-shaped. Furthermore, there is no need for a symmetrical cross-section. The cross-section can also be asymmetrical.

According to one form, the cross car beam is made from an injection molded fiber reinforced polymer. The advantage here is that integrally formed cross car beam can be produced substantially automatically. The fibers are introduced automatically during the injection molding process of the cross car beam and are oriented depending on the force flow by means of targeted control of the injection molding nozzles.

In one aspect of the present disclosure, the crash pad includes a foam core. The foam core is suitable for distributing the force during the deformation of the crash pad. For example, the foam core consists of expanded propylene foam.

According to the disclosure, the crash pad is covered by a cover element facing a passenger compartment such that an impact from the passenger compartment on the cover element is transferred to the crash pad. This has the advantage of providing a flat and regular surface for a passenger in the passenger compartment. For example, the cover element can cover several crash pads, whereby an even distribution of the impact energy on several crash pads is possible even in the case of a punctual impact on the cover element.

In one aspect, the collapsible guiding element is covered by a cover element facing the passenger compartment such that the impact energy from the passenger compartment on the cover element is transferred to the collapsible guiding element. This also has the advantage of providing a flat and regular surface for a passenger in the passenger compartment. For example, the cover element can cover several guiding elements, whereby an even distribution of the impact energy on several guiding elements is possible even in the case of a punctual impact on the cover element.

In one variation, the cover element covers several crash pads and several guiding elements at the same time. In this way, a cover element can simultaneously transfer impact energy to the crash pads and to the guiding elements.

According to one form of the disclosure the collapsible guiding element includes a predetermined breaking location. This has the advantage that the deformation of the crash pad can be gradual. Thus, there is an initial deformation of the crash pad before the predetermined breaking location of the guiding element is reached. However, if the impact energy exceeds a predetermined threshold, the predetermined breaking location comes into effect and the deformation of the crash pad can be continued beyond the initial deformation of the crash pad before the predetermined breaking location.

In a variation of the present disclosure, the collapsible guiding element includes an impact unit adapted to collapse relative to the collapsible guiding element if an impact energy from the passenger compartment on the cover element is transferred to the impact unit. This allows the collapse of the impact unit to be controlled.

In one form, the impact unit is adapted to collapse into an internal space of the collapsible guiding element.

According to the disclosure, the predetermined breaking location is placed between the collapsible guiding element and the impact unit. According to one form, the predetermined breaking location includes a reduced cross section. Thus, on the one hand, the guiding element including the impact unit can be produced in one piece with the cross car beam. On the other hand, the predetermined breaking location can be produced very easily and reliably by means of injection molding. The reduced cross section can be produced in such a way that there are no reinforcing fibers in this area. This means that the failure of the predetermined breaking location can be adjusted and energy absorption capability can be increased.

In one variation, the predetermined breaking location extends into a peripheral direction of the guiding element. Thus, the collapse of the impact unit after exceeding the determined breaking point into the internal space of the collapsible guiding element can be provided.

According to a form of the disclosure, the cross car beam includes a first collapsible guiding element placed adjacent to the crash pad and a second collapsible guiding element placed adjacent to the crash pad, wherein the first collapsible guiding element is placed at a different side of the crash pad compared to the second collapsible guiding element. The placement of the collapsible guiding elements provides that the deformation of the crash pad is particularly controlled because the crash pad can be guided from several sides.

According to a further variant of the disclosure, a cross car beam for a vehicle is proposed including a first main body extending in a longitudinal direction from a first end to a second end, the first main body having a u-shaped cross section following the longitudinal direction. The cross car beam is formed integrally by at least one fiber reinforced polymer.

By forming the cross car beam integrally by at least one fiber reinforced polymer the total number of components can be reduced. Nevertheless, the cross car beam must be able to absorb the forces that occur. The occurring forces are transferred from the vehicle body to the cross car beam via fixing points. The place and the number of fixing points are predefined from the body manufacturer. Likewise, the occurring forces that will be transferred to the cross car beam and that determine the stiffness of the cross car beam are predefined from the body manufacturer.

The force absorption is made possible on the one hand by the u-shaped cross-section extending continuously in the longitudinal direction from the first end to the second end. The u-shaped cross-section is easy to produce and has a high degree of rigidity.

On the other hand, the force absorption is achieved by the fibers reinforcing the polymer. The fibers include glass fibers or carbon fibers whose orientation in the polymer is aligned with the force flow through the cross car beam.

According to one variation, the cross car beam is made from an injection molded fiber reinforced polymer. The advantage here is that integrally formed cross car beam can be produced substantially automatically. The fibers are introduced automatically during the injection molding process of the cross car beam and are oriented depending on the force flow by means of targeted control of the injection molding nozzles.

In one form of the present disclosure, the first main body includes a first opening dividing the first main body into an upper part and a lower part, the upper part and the lower part each having a u-shaped cross section. This allows the first main body to be adapted more flexibly to body-specific conditions. For example, ventilation ducts can be routed through the first opening to supply air to the vehicle interior or cables can be routed to connect to an instrument panel or display panel. By forming the upper part and the lower part with a u-shaped cross section, the rigidity of the cross car beam can be maintained despite the first opening.

According to the disclosure, the u-shaped cross sections each include inner ribs reinforcing the first main body. The inner ribs are arranged inside the u-shaped cross section and connect the opposite legs of the u-shaped cross section. To further strengthen the beam the ribs cross over each other. Thus, the stiffness of the cross car beam can be increased with a low material input.

In one aspect, the first main body has a u-shaped additional cross section following parallel to the longitudinal direction. This has the technical advantage of additionally increasing the stiffness of the cross car beam. For example, the u-shaped additional cross section can be arranged parallel to the already described u-shaped cross-section and extend completely over the entire length of the main body from the first end to the second end. For example, the additional u-shaped cross-section can also be arranged offset, whereby it still extends in the longitudinal direction and increases the stiffness of the beam.

According to one form of the disclosure the cross car beam includes a second main body extending from a first end of the second main body to a second end of the second main body following the longitudinal direction, the second main body having a u-shaped cross section following the longitudinal direction. This allows for additional stiffening of the cross car beam. The second main body can be easily aligned with the first main body, which aligns the u-shaped cross-sections of both main bodies in the longitudinal direction.

In one form, the first end of the first main body corresponds to the first end of the second main body. This gives the advantage that both main bodies extend from the first end to the second end of the first main body. Thus, the second end of the first main body also corresponds to the second end of the second main body.

In one aspect of the present disclosure, the first main body having the u-shaped cross section and the second main body having the u-shaped cross section are arranged adjacent to each other, wherein lateral openings of the u-shaped cross section of the first main body and lateral openings of the u-shaped cross section of the second main body are facing each other.

The u-shaped cross-sections leave openings at the sides. The first main body and the second main body are placed next to each other in such a way that the side openings close each other. This results in a body that is closed to the outside and has a particularly high rigidity.

In one form, the first main body and the second main body are welded to each other such that the u-shaped cross sections of the first main body and the second main body define a closed shell cross section. This creates a particularly strong connection between the first main body and the second main body. The two u-shaped cross sections together form a closed shell cross section and thus gain a very high degree of rigidity. For example, the first main body and the second main body are joined together by means of vibration welding. This joining method brings the additional advantage that the ribs of the first and second main body arranged inside the u-shaped cross section can also be directly welded together.

In one variation of the present disclosure, the first main body includes a glove box housing. This has the technical advantage that another important component of the cross car beam becomes an integral part, which further reduces the number of components. Another important advantage is that the integration of the glove box housing further increases the stiffness of the cross car beam. Thus, the glove box housing has a dual function.

In one form, a wall thickness of the glove box housing facing the first main body is thicker compared to a wall thickness of the glove box housing facing a passenger compartment.

According to one variation, a wall thickness of the glove box housing is continuously decreasing from the first main body to the passenger compartment.

According to one form, the main body includes a steering column carrier. The integration of the steering column carrier gives the advantage that another important component of the cross car beam becomes an integral part and further reduces the number of components. Another important advantage is that the integration of the steering column carrier further increases the stiffness of the cross car beam. Thus, the steering column carrier has a dual function.

According to a further variant of the disclosure a cross car beam for a vehicle is proposed including a first main body extending in a longitudinal direction from a first end to a second end, at least a first upper fixing point and a first lower fixing point at the first end of the first main body, and at least a second upper fixing point and a second lower fixing point at the second end of the first main body, wherein a first center line is running through the first upper fixing point at the first end and the second upper fixing point at the second end. The first main body having a u-shaped cross section following the first center line The cross car beam is formed integrally by at least one fiber reinforced polymer.

By forming the cross car beam integrally by at least one fiber reinforced polymer the total number of components can be reduced. Nevertheless, the cross car beam should be able to absorb the forces that occur. The occurring forces are transferred from the vehicle body to the cross car beam via the fixing points. The place and the number of fixing points are predefined from the body manufacturer. Likewise, the occurring forces that will be transferred to the cross car beam and that determine the stiffness of the cross car beam are predefined from the body manufacturer.

The force absorption is made possible on the one hand by the u-shaped cross section extending continuously in the longitudinal direction from the first end to the second end. The u-shaped cross-section is easy to produce and has a high degree of rigidity.

Due to the fact that the first center line extends through the first and second upper fixing points and thus the u-shaped cross-section follows the center line, the first and second upper fixing points of the first main body are substantially at the same level as the u-shaped cross section. A load application via the first and second upper fixing points on the cross car beam can thus be directly transmitted through the u-shaped cross-section. In this way, the stiffness of the cross car beam can be increased and the lever from the load-bearing fixing points is reduced.

On the other hand, the force absorption is achieved by the fibers reinforcing the polymer. The fibers may include glass fibers or carbon fibers whose orientation in the polymer is aligned with the force flow through the cross car beam.

According to one form the cross car beam is made from an injection molded fiber reinforced polymer. The advantage here is that integrally formed cross car beam can be produced substantially automatically. The fibers are introduced automatically during the injection molding process of the cross car beam and are oriented depending on the force flow by means of targeted control of the injection molding nozzles.

In one variation of the present disclosure, a distance between the first upper fixing point at the first end and the first center line and a distance between the second upper fixing point at the second end and the first center line is less than 30 mm.

According to the disclosure, the first main body includes a first sub body arranged at the first end of the first main body extending transversal to the longitudinal direction between first end and second end.

The first sub body does not run in a longitudinal direction but in a transversal direction. This additionally increases the stiffness of the cross car beam.

In one form, the first sub body includes the first upper fixing point and the first lower fixing point. This achieves the technical advantage that a load application can be better transmitted from the fixing points to the cross car beam.

To increase the stiffness of the first sub body and thus to increase the stiffness of the entire cross car beam the first sub body has an \ u-shaped cross section.

According to one aspect of the disclosure the u-shaped cross section follows the transversal direction.

In another form of the present disclosure, the first main body includes a second sub body arranged at the second end of the first main body extending transversal to the longitudinal direction between first end and second end.

The second sub body does not run in a longitudinal direction but in a transversal direction. This additionally increases the stiffness of the cross car beam.

In one aspect, the second sub body includes the second upper fixing point and the second lower fixing point, which brings with it the advantage that a load application can be better transmitted from the fixing points to the cross car beam. To further increase the stiffness of the second sub body and thus to increase the stiffness of the entire cross car beam, the second sub body has a u-shaped cross section.

Comparable with the first sub body, the u-shaped cross section of the second sub body follows the transversal direction.

According to the disclosure, the u-shaped cross sections include inner ribs reinforcing the first main body. The inner ribs are arranged inside the u-shaped cross section and connect the opposite legs of the u-shaped cross section. To further strengthen the beam the ribs cross over each other. Thus, the stiffness of the cross car beam can be increased with a low material input.

In one form of the present disclosure, the first sub body and the second sub include inner ribs respectively reinforcing the first sub body and the second sub body. The inner ribs allow for the identical advantageous effect on the stiffness on both the first sub body and the second sub body. In total the stiffness of the complete cross car beam is increased.

All features and advantages disclosed herein can be combined with each other in any combination without exception.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Further advantages and developments as well as features of the present disclosure are revealed by the following detailed description of an exemplary variation made with reference to the accompanying drawings.

Consequently, in the different views, identical parts are designated by identical reference numerals.

Figure 1:
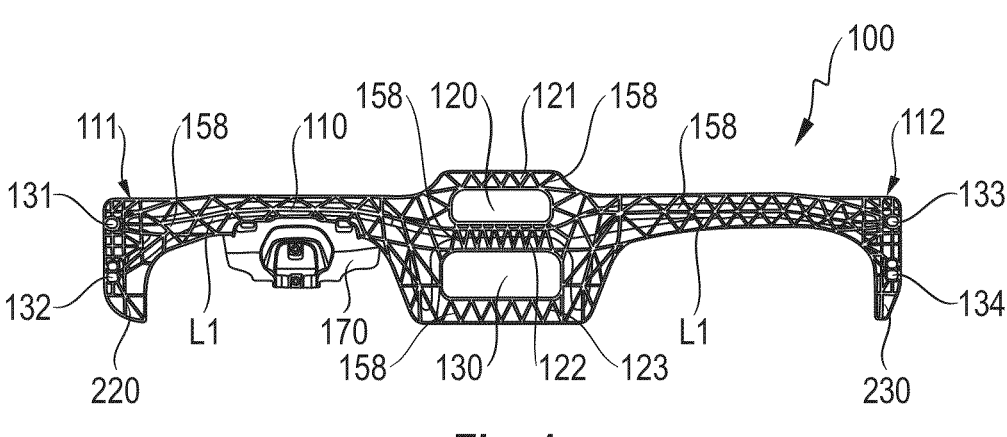
FIG. 1 shows a view of a cross car beam in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a view of a cross car beam 100 from a rear side view. The cross car beam 100 includes a first main body 110 extending from a first end 111 to a second end 112. From the first end 111 to the second end 112 extends a longitudinal direction. The longitudinal direction describes the connection from a left hand door to a right hand door of a vehicle in whose passenger compartment the cross car beam 100 is provided for.

For reasons of rigidity, the cross car beam 100 includes a u-shaped cross section 150 (not shown). The u-shaped cross section follows the longitudinal direction of the first main body 110 from the first end 111 to the second end 112. The space between the legs of the u-shaped cross section 150 includes inner ribs 158 which are used to further increase the stiffness of the cross car beam 100.

The complete cross car beam 100 from the first end 111 to the second end 112 including the inner ribs 158 is formed integrally by at least one fiber reinforced polymer.

In a middle section the cross car beam 100 includes a first opening 120 and a second opening 130. The first opening 120 and the second opening 130 divide the first main body 110 into an upper part 121 a middle part 122 and a lower part 123. Also, the upper part 121, the middle part 122 and the lower part 123 have each a u-shaped cross section 150 for reasons of rigidity. Additionally, each u-shaped cross section 150 includes inner ribs 158 to further increase the stiffness of the cross car beam 100.

At the first end 111 of the cross car beam 100 a first sub body 220 is arranged in a transversal direction. Also, the first sub body 220 is having a u-shaped cross section 250, wherein a first upper fixing point 131 and a first lower fixing point 132 is placed within the first sub body 220. To further increase of the stiffness the first sub body 220 includes inner ribs 158.

At the second end 112 of the cross car beam 100 a second sub body 230 is arranged in a transversal direction. Also, the second sub body 230 is having a u-shaped cross section 250, wherein a second upper fixing point 133 and a second lower fixing point 134 is placed within the second sub body 230. To further increase of the stiffness the second sub body 230 includes inner ribs 158.

The cross car beam 100 includes a first center line L1 that is running through the first upper fixing point 131 at the first end 111 and the second upper fixing point 133 at the second end 112.

The first center line L1 runs through the middle part 122 to provide a continuous progression of a u-shaped cross section 150 from the first end 111 to the second end 112.

Between the first end 111 and the middle section including the upper part 121, the middle part 122 and the lower part 123 a steering column carrier 170 is provided at the cross car beam 100. Again, the complete cross car beam 100 from the first end 111 to the second end 112 including the first sub body 220, the second sub body 230, steering column carrier 170 and the middle section including the upper part 121, the middle part 122 and the lower part 123 is formed integrally by at least one fiber reinforced polymer.

Figure 2A:
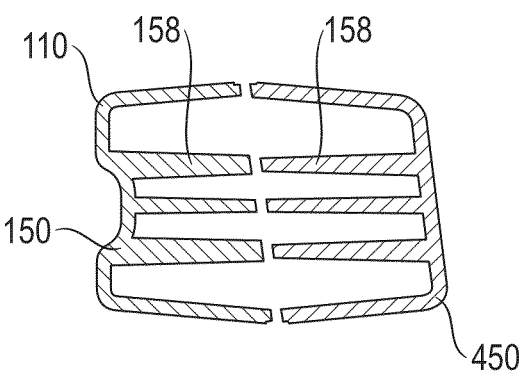
FIG. 2A shows two facing u-shaped cross sections in accordance with the teachings of the present disclosure.

FIG. 2A shows two facing u-shaped cross sections 150, 450. The respective open side of each u-shaped cross section 150, 450 is directed towards each other. The u-shaped cross sections 150, 450 differ slightly and both include inner ribs 158 for further increase of the stiffness.

Figure 2B:
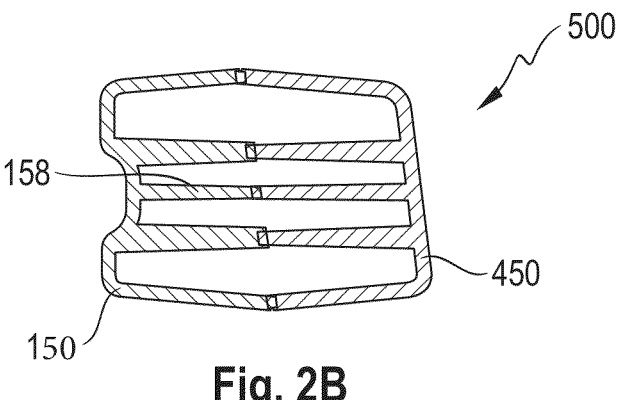
FIG. 2B shows two welded u-shaped cross sections in accordance with the teachings of the present disclosure.

FIG. 2B shows two welded u-shaped cross sections 150, 450. The u-shaped cross sections 150, 450 and additionally the inner ribs 158 are welded with each other. In this welded state, the two cross sections define a common shell cross section 500.

Figure 3:
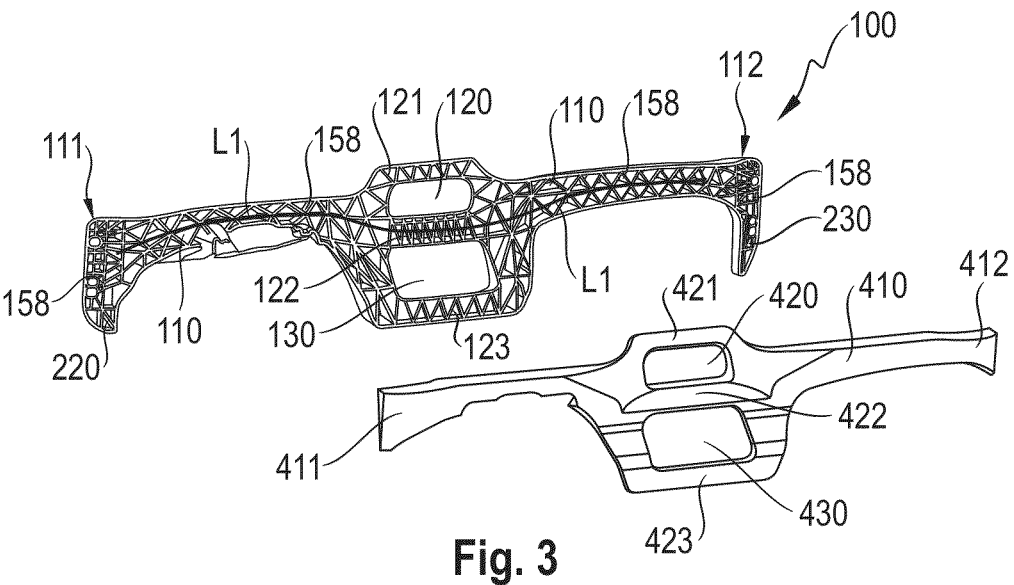
FIG. 3 shows a view of a first main body and a second main body in accordance with the teachings of the present disclosure.

FIG. 3 shows a view of a first main body 110 and a second main body 410 from a rear side view.

The first main body 110 corresponds identically to the first main body 110 described in FIG. 1. A repeated description of identical features is thus dispensed with. In the following the description is therefore restricted to the second main body 410.

The second main body 410 is designed to be aligned with the first main body 110. For example, the first main body 110 and the second main body 410 are welded together according to the cross sectional view shown in FIG. 2B to increase the stiffness of the cross car beam 100.

The second main body 410 also has a u-shaped cross section 450 (not shown) and is arranged adjacent to the first main body 110. The lateral openings of the u-shaped cross sections 150, 450 are facing each other.

Further the second main body 410 also extends from a first end 411 to a second end 412 and follows the longitudinal direction.

As with the first main body 110 u-shaped cross section 450 of the second main body 410 follows the mentioned longitudinal direction.

In a middle section the second main body 410 includes a first opening 420 and a second opening 430. The first opening 420 and the second opening 430 divide the second main body 410 into an upper part 421 a middle part 422 and a lower part 423. Also, the upper part 421, the middle part 422 and the lower part 423 have each a u-shaped cross section 450 for reasons of rigidity. Additionally, each u-shaped cross section 450 includes inner ribs 158 to further increase the stiffness of the second main body 410.

In a condition in which the first main body 110 and the second main body 410 are welded together, the first openings 120, 420 and the second openings 130, 430 are aligned to correspond to each other.

In contrast to the first main body 110, the second main body 410 does not have any first upper fixing points 131, second upper fixing points 133, first lower fixing points 132, and second lower fixing points 134.

The second main body 410 is formed integrally by at least one fiber reinforced polymer.

Figure 4:
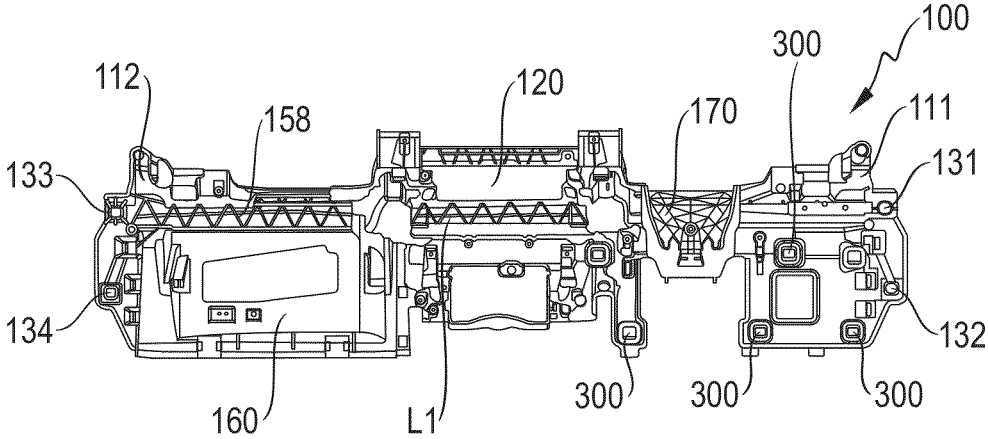
FIG. 4 shows a view of a further cross car beam in accordance with the teachings of the present disclosure.

FIG. 4 shows a view of a further cross car beam 100 from a front side view.

The cross car beam 100 includes the first main body 110 and corresponds almost identically to the first main body 110 described in FIG. 1. A repeated description of identical features is thus dispensed with. In the following the description is therefore restricted to the additional features shown in FIG. 4.

The first main body 110 extends from a first end 111 to a second end 112 in a longitudinal direction. The longitudinal direction describes the connection from a left hand door to a right hand door of a vehicle in whose passenger compartment the cross car beam 100 is provided for. For reasons of rigidity, the first main body 110 includes a u-shaped cross section 150 following the longitudinal direction of the first main body 110 from the first end 111 to the second end 112. Further stiffness is reached by inner ribs 158 inside the u-shaped cross section 150.

Between the first end 111 and the steering column carrier 170 several collapsible guiding elements 300 are show. Adjacent to the second end 112 a glove box housing 160 is attached to the first main body 110. Again, the complete cross car beam 100 from the first end 111 to the second end 112 including the first sub body 220, the second sub body 230, the steering column carrier 170 and the glove box housing 160 is formed integrally by at least one fiber reinforced polymer.

Figure 5:
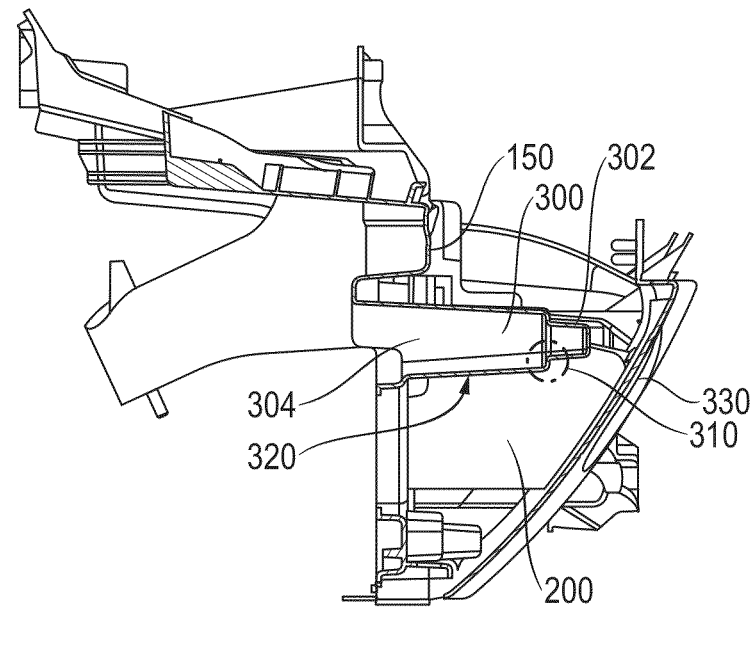
FIG. 5 shows a cross section view of a cross car beam in accordance with the teachings of the present disclosure.

FIG. 5 shows a cross section view of a cross car beam 100.

The cross car beam 100 includes a deformable crash pad 200 that is adapted to absorb impact energy. Inside the deformable crash pad 200 there is a foam core to distribute the force acting on the deformable crash pad 200. The deformable crash pad 200 is placed on the first main body 110 and is covered by a cover element 330. The cover element 330 is facing the passenger compartment such that an impact from a passenger sitting in the passenger compartment on the cover element 330 can be transferred to the deformable crash pad 200.

Additionally, a collapsible guiding element 300 is placed parallel to the deformable crash pad 200 and is adapted to guide the deformable crash pad 200 during deformation by the cover element 330. The cover element 330 also covers the collapsible guiding element 300 such that the cover element 330 can collapse the collapsible guiding element 300 in the event of an energy impact.

To collapse the collapsible guiding element 300 a threshold of a predetermined breaking location 310 has to be exceeded.

So if the impact on the cover element 330 is large enough, the deformable crash pad 200 is deformed first. If the impact energy absorbed is not sufficient, the cover element 330 comes into contact with the impact unit 302 of the collapsible guiding element 300. If a threshold is exceeded, a predetermined breaking location 310 fails and the impact unit 302 is displaced by the cover element 330 into an internal space 304. The predetermined breaking location 310 is placed between the collapsible guiding element 300 and the impact unit 302. In a cross section view the predetermined breaking location 310 includes a reduced cross section and extends into a peripheral direction of the collapsible guiding element 300. Thus, the predetermined breaking location is arranged in a ring around the collapsible guiding element 300.

As a consequence, the deformable crash pad 200 can be further deformed to absorb impact energy. During the entire deformation process, a guiding surface 320 on the lateral outer shaft of the collapsible guiding element 300 provides that the deformation of the deformable crash pad 200 takes place in an orderly and straight line.

Above the collapsible guiding element 300 is the u-shaped cross section 150 of the first main body 110 extending in the longitudinal direction.

Again, the complete cross car beam 100 including the u-shaped cross section 150 extending from the first end 111 to the second end 112 including the collapsible guiding element 300 and the impact unit 302 is formed integrally by at least one fiber reinforced polymer.

Figure 6:
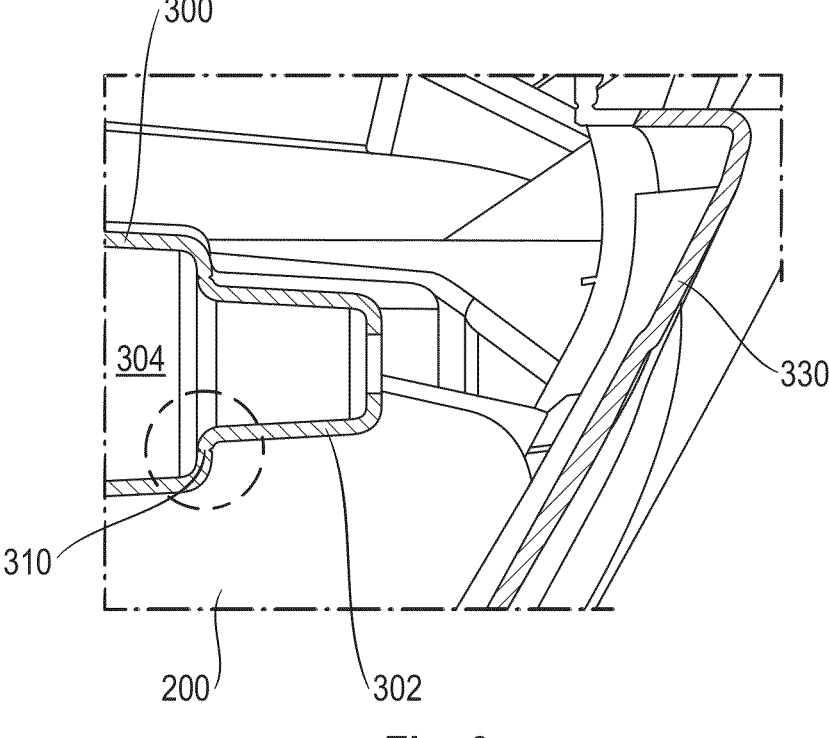
FIG. 6 shows a detailed view the excerpt of FIG. 5 in accordance with the teachings of the present disclosure.

FIG. 6 shows a detailed view the excerpt of FIG. 5.

The deformable crash pad 200 is located between first main body 110 and cover element 330. Additionally, the predetermined breaking location 310 is located between the collapsible guiding element 300 and the impact unit 302. The predetermined breaking location 310 is placed between the collapsible guiding element 300 and the impact unit 302. In a cross section view the predetermined breaking location 310 includes a reduced cross section and extends into a peripheral direction of the collapsible guiding element 300.

Figure 7:
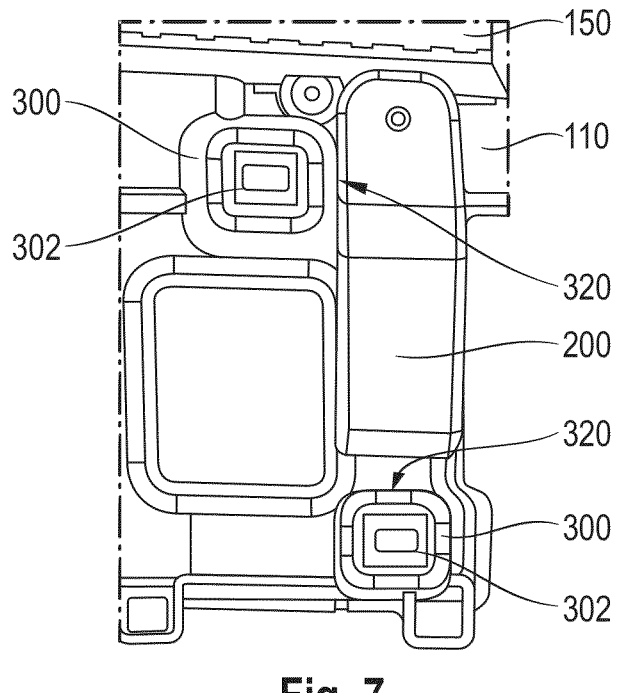
FIG. 7 shows a crash pad in a front view in accordance with the teachings of the present disclosure.

FIG. 7 shows a deformable crash pad 200 in a front view. Next to the deformable crash pad 200 is a first collapsible guiding element 300 including the impact unit 302 and the predetermined breaking location 310. A guiding surface 320 is placed at the lateral outer side of the collapsible guiding element 300 facing the deformable crash pad 200 to provide a guided deformation of the deformable crash pad 200. Below the deformable crash pad 200 is a second collapsible guiding element 300 including the impact unit 302 and the predetermined breaking location 310. Also the second collapsible guiding element 300 includes a guiding surface 320 that is placed at a lateral outer side of the second collapsible guiding element 300 facing the deformable crash pad 200.

Figure 8:
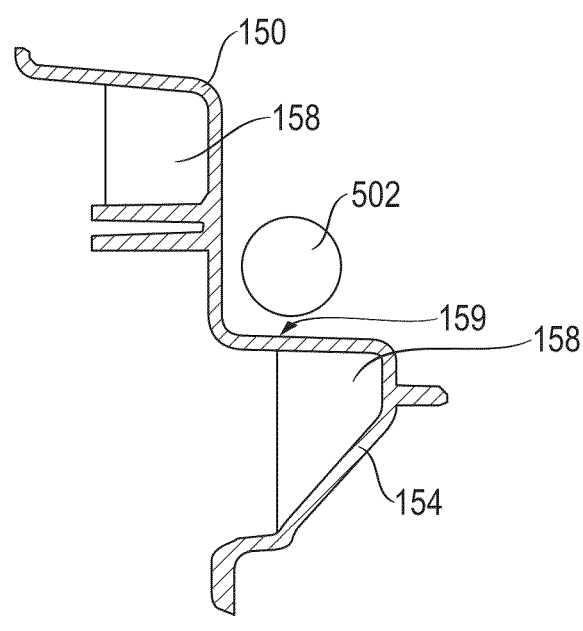
FIG. 8 shows a further cross section view of a cross car beam in accordance with the teachings of the present disclosure.

FIG. 8 shows a further cross section view of a cross car beam 100.

The first main body 110 has a u-shaped cross section 150 and a u-shaped additional cross section 154. Both u-shaped cross section 150 and the u-shaped additional cross section 154 are following parallel to each other and follow the longitudinal direction. Within the u-shaped cross section 150 and the u-shaped additional cross section 154 there are inner ribs 158 for reinforcement.

The u-shaped additional cross-section 154 is arranged offset, whereby the u-shaped cross section 150 and the u-shaped additional cross section 154 together define a stepped cross section structure. The resulting protrusion area 159 is suitable for laying cable harnesses 502.

Although the present disclosure has been explained in detail with reference to one aspect, it goes without saying that the present disclosure is not limited to this form, but rather that modifications and changes are possible within the scope of the following claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cross car beam for a vehicle, the cross car beam comprising:
    a first main body extending in a longitudinal direction from a first end to a second end, the first main body comprising at least one deformable crash pad adapted to absorb impact energy; and
    at least one collapsible guiding element disposed adjacent to the at least one deformable crash pad,
    wherein the at least one collapsible guiding element comprises a guiding surface adapted to guide the at least one deformable crash pad during deformation, and
    wherein the cross car beam is formed integrally by at least one fiber reinforced polymer.

2. The cross car beam of claim 1, wherein the cross car beam is made from an injection molded fiber reinforced polymer.

3. The cross car beam of claim 1, wherein the at least one deformable crash pad comprises a foam core.

4. The cross car beam of claim 1, wherein the at least one deformable crash pad is covered by a cover element facing a passenger compartment such that an impact from the passenger compartment on the cover element is transferred to the at least one deformable crash pad.

5. The cross car beam of claim 1, wherein the at least one collapsible guiding element is covered by a cover element facing a passenger compartment such that the impact energy from the passenger compartment on the cover element is transferred to the at least one collapsible guiding element.

6. The cross car beam of claim 1, wherein the at least one collapsible guiding element comprises a predetermined breaking location.

7. The cross car beam of claim 6, wherein the predetermined breaking location is disposed between the collapsible guiding element and an impact unit.

8. The cross car beam of claim 6, wherein the predetermined breaking location comprises a reduced cross section.

9. The cross car beam of claim 8, wherein the predetermined breaking location extends into a peripheral direction of the at least one collapsible guiding element.

10. The cross car beam of claim 1, wherein the at least one collapsible guiding element comprises an impact unit adapted to collapse relative to the at least one collapsible guiding element if an impact energy from a passenger compartment is transferred to the impact unit via a cover element.

11. The cross car beam of claim 10, wherein the impact unit is adapted to collapse into an internal space of the collapsible guiding element.

12. The cross car beam of claim 1, wherein the at least one collapsible guiding element comprises a first collapsible guiding element placed adjacent to the at least one deformable crash pad and a second collapsible guiding element placed adjacent to the at least one deformable crash pad, wherein the first collapsible guiding element is placed at a different side of the at least one deformable crash pad relative to the second collapsible guiding element.

\* \* \* \* \*